United States Patent [19]
Elser

[11] 3,754,479
[45] Aug. 28, 1973

[54] SELECTIVE ASSEMBLY POWER STEERING MECHANISM

[75] Inventor: Dieter Elser, Bobingen, Germany

[73] Assignee: Zahnradfabrik Friedrichshafen Aktiengesellschaft, Postfach, Germany

[22] Filed: May 23, 1972

[21] Appl. No.: 255,974

[30] Foreign Application Priority Data
May 26, 1971 Germany................... P 21 26 090.2

[52] U.S. Cl..................... 74/499, 74/388 PS, 92/59
[51] Int. Cl............................................... B62d 1/20
[58] Field of Search............... 74/388 PS, 498, 499, 74/500; 92/59; 91/54

[56] References Cited
UNITED STATES PATENTS

| | | |
|---|---|---|
| 1,768,799 | 7/1930 | Stanley................................. 92/59 |
| 2,916,945 | 12/1959 | Rittenhouse et al.................. 74/499 |
| 3,235,953 | 2/1966 | Adams......................... 74/388 PS X |
| 3,498,153 | 3/1970 | Wagner................................ 74/499 |
| 3,693,470 | 9/1972 | Masuyama........................... 74/499 |

Primary Examiner—Allan D. Herrmann
Attorney—Zalkind, Horne & Shuster

[57] ABSTRACT

A power steering mechanism is constructed for selective assembly so that a steering worm spindle may protrude from either end of a housing, the opposite end being sealed. The housing ends are constructed dimensionally so that interchangeable bearings and seals can be applied and either of a pair of steering worm spindles used, depending on the space into which the housing must be fitted in a vehicle. This minimizes dimensional space requirements. Similarly, either of a pair of housings may be selected, usable with either one of the aforementioned pair of spindles, thereby effecting choice of four assembly arrangements.

5 Claims, 3 Drawing Figures

SELECTIVE ASSEMBLY POWER STEERING MECHANISM

The invention utilizes for the most part conventional components of a double acting pressure cylinder for steering power boost, the construction and operation of such components when assembled being well known. However, inventive novelty resides in the provision of certain components which can be selectively assembled with the other components in order to provide certain desired minimum distances in the overall configuration.

Such minimum distances are provided in different configurations in order to render it possible to fit the assembled device into various vehicle installations where space is, of course, at a premium.

Thus, a selective assembly of components of the invention comprise a pair of steering worm spindles which differ to the extent that the distance between the respective steering worm sections and the respective portions of the spindles which connect to a manually operable steering wheel is greater for one such spindle than it is for the other. The housing of the device has apertured ends designed so that a steering worm spindle can go through a particular end to connect with the piston in the housing. The aforementioned difference in distances results in effecting a minimum distance from the connecting portion of one spindle to the axis of the steering shaft which is actuated via the gear sector engaging the piston, or in the case of the other spindle the minimum distance between such axis and the other end of the housing is effected.

A particular feature of the invention is the fact that the ends of the cylinder are so designed that either end can be closed and interchangeable seal means utilized for the housing ends.

Additional selectivity of overall exterior configuration is achieved by providing a pair of housings which differ only in the direction in which the steering shaft which carries the gear sector extends through the portion of the housing in which the steering shaft and gear sector is located. By selective assembly of one or the other of the steering worm spindles with one housing or the other a variety of external configurations to effect the aforementioned minimum distances is achieved.

The advantages of effecting a selective minimum distance is obvious in order to make available a power steering device which can be installed in a large variety of vehicles. In particular, the invention possesses advantages which overcome drawbacks found in German Patent No. 1152623 and German published application No. 1816295, wherein the versatility achieved by the disclosure herein is not possible.

A detailed description of the invention now follows in conjunction with the appended drawing in which.

Figure 1:
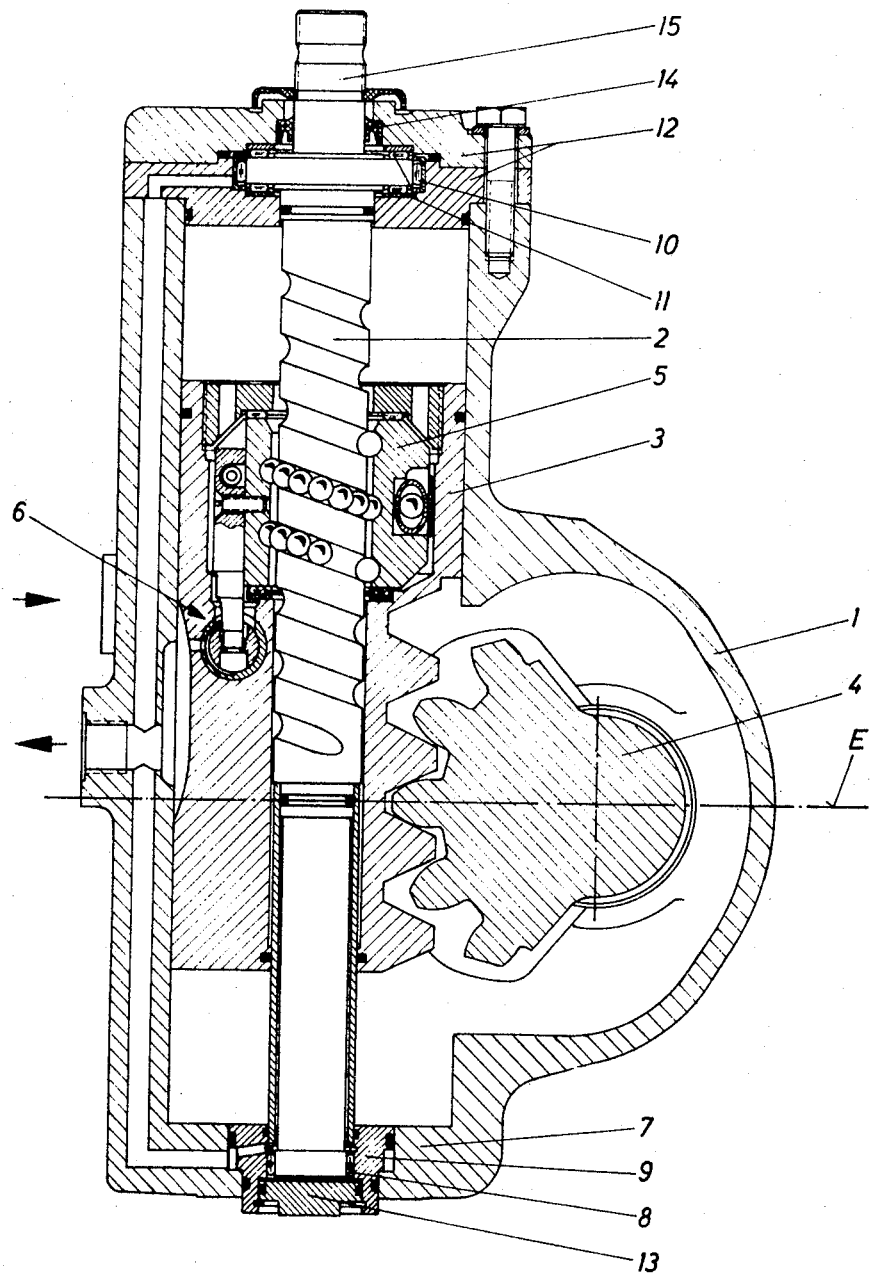
FIG. 1 is a cross section taken longitudinally through an assembled power steering device showing one form of steering worm spindle.

Referring to FIG. 1 of the drawing, a steering gear housing means 1 is provided for a steering worm spindle 2 therein in which the steering worm section is threaded to coact by means of ball or worm nut 5 with the double acting pressure piston 3 in a pressure cylinder portion of the housing means. Thus, a double acting cylinder portion as shown, all in accordance with conventional construction is provided.

Passages for feed and exhaust of pressure fluid including valving 6, are provided, none of which need be described, being very well known.

The housing means has an integral offset portion for housing the steering shaft 4 on an axis perpendicular to the axis of spindle 2 which shaft has the usual gear sector to coact with the rack on the piston in a conventional manner. The plane E which passes through the steering shaft axis perpendicular to the axis of the steering worm spindle will be noted as being considerably closer to the closed end 7 of the cylinder portion than to the upper end through which the steering worm spindle passes. Similarly, the shorter portion of piston 3 from below the central tooth of the gear sector is below the plane E.

This relationship of cylinder and steering shaft portions is useful in the present invention since it permits minimizing of distance between the plane E and closed end of the cylinder portion by selection of the steering worm spindle 2.

The steering worm spindle 2 is mounted at the lower or closed end of the housing means by the use of a radial bearing 8 carried in a bearing ring 9 socketed at the integral apertured end of the cylinder portion. A sealing plug 13 is carried within the ring 9 for sealing the end of the spindle 2.

The opposite end of the cylinder portion of the housing means is likewise apertured except that cover means of a removable type is provided inasmuch as the piston must be introduced into the cylinder portion through that end. Cover members are provided consisting of two parts 12 as shown, clamped to the end of the cylinder portion by bolts. Suitable cavities are provided in the closure members or cover to accommodate a sealing ring 14 and a combination thrust and radial bearings, 10, 11.

It will be noted that the connecting portion 15 extends through the cover members 12 for connection to a manually operable steering wheel (not shown) by any conventional means none of which forms part of the invention.

Figure 2:
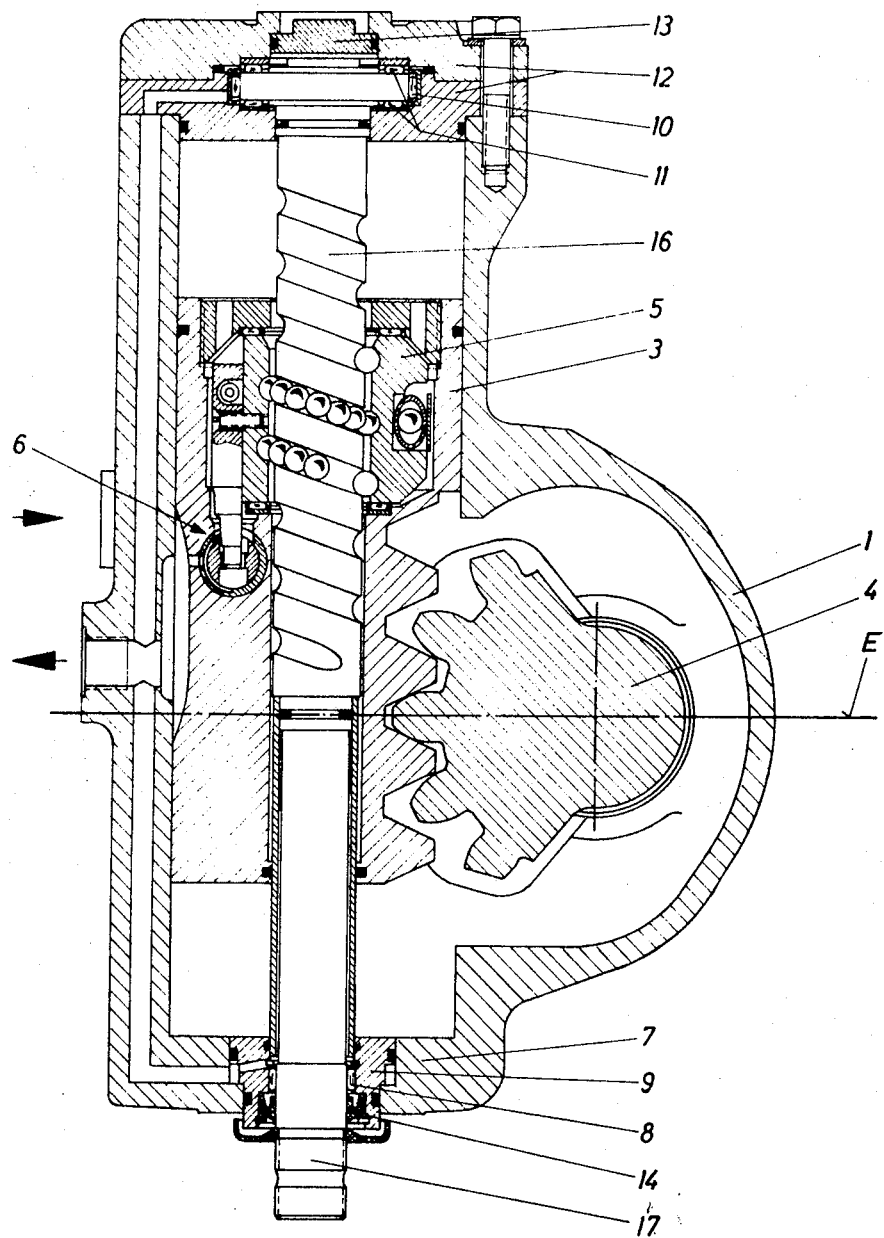
FIG. 2 is an assembly utilizing another form of steering worm spindle, in this instance, passing into the housing through the end opposite that shown in FIG. 1.

It should be particularly noted that the diameter of the sealing ring 14 and the diameter of the sealing plug 13 are the same so that these two members can be interchanged. Reference is made to FIG. 2 at this point to show the interchanged condition for the elements 13 and 14.

Referring now to FIG. 2 the housing means 1 is identical as are all other components except for the steering spindle 16. It will be noted that in this instance the steering worm section is considerably further away from the spindle connecting portion 17 than is the distance between the worm section and connecting portion 15 shown in FIG. 1. However, the worm sections are disposed to medially engage the ball worm nut in neutral steering position in both FIG. 1 and FIG. 2, to provide full working movement in either direction. It will also be noted in FIG. 2 that the end 7 of the housing means is used in order to permit the connecting portion 17 to extend therefrom. The distance from connecting portion 17 to plane E is now minimum.

Thus, by selection of steering worm spindle 2 or 16, different exterior configurations are possible. In either case, the ends of the cylinder portion are apertured and accommodate bearings and seals that ate interchangeable for either end of the cylinder portion. As hereinabove noted in FIG. 1, the seal plug 13 is at the integral end of the cylinder portion while in FIG. 2 it is at the end closed by cover members 12. Similarly the seal 14 in FIG. 1 is accommodated within one of the cover members 12 while in FIG. 2 it is within the bearing support ring 9.

As seen in FIGS. 1 and 2, the same housing means is utilized, namely, the steering shaft 4 extending outside of its housing portion in a direction through the plane of the paper. However, a mirror image housing means is provided as part of the invention wherein the housing portion for shaft 4 is designed so that the bearing support collar is located at the opposite side or wall. Thus, the steering shaft 4 would extend outwardly away from the plane of the paper. Accordingly, the invention contemplates selectivity of housing means comprising a pair of housings which in combination with selectivity of a pair of steering worm spindles effects increased versatility and range or installations of an assembled device.

Figure 3:
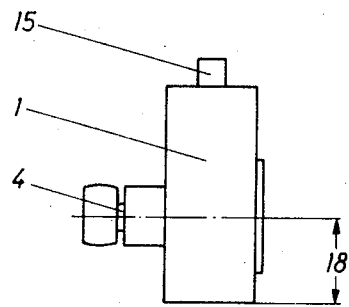
FIG. 3 shows diagrammatic views of external configurations resulting from selection of either one of a pair of steering worm spindles and selection of either one of a pair of housings.
Figure 3:
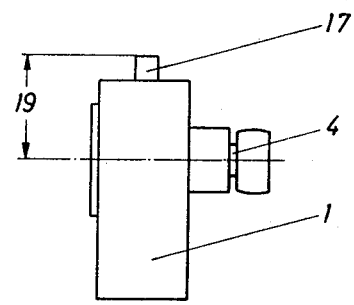
Figure 3:
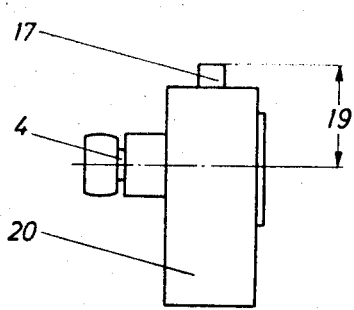
Figure 3:
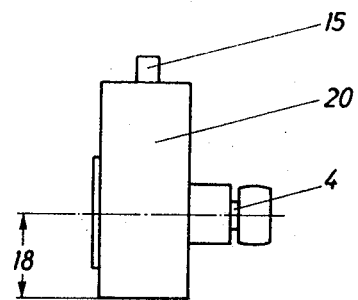

Referring particularly to FIG. 3, the upper diagrams show the housing means 1, all as heretofore described, wherein the steering shaft 4 protrudes in the direction shown in FIGS. 1 and 2. The lower diagrams show a mirror image housing means 20 wherein the steering shaft 4 will be understood to protrude in the opposite direction. For comparison purposes, the upper left diagram shows a steering worm spindle of the configuration shown in FIG. 1 having the connecting portion 15 extending from the housing means 1, while the lower right portion shows such spindle in the housing means 20. Similarly, the spindle shown in FIG. 2 having connection portion 17 is shown as disposed in a housing means 1 at the upper right in FIG. 3 and in a housing means 20 in the lower left in FIG. 3.

It will thus be apparent by noting the dimension 18 that a minimum distance inherently designed into the housing means from the axis of the steering shaft 4 to the closed end of the housing means is provided for housing means 1 or 20 with a spindle such as spindle 2.

On the other hand, the minimum distance 19 between the axis of the steering shaft 4 and the connection portion 17 of a spindle such as spindle 16 is illustrated.

Such minimum distances as are provided for the invention permit the fitting of an assembled device into cramped surroundings and in various compact arrangements. Thus, as noted in FIG. 3, the steering shaft 4 can extend in either direction with a housing means 1 or in either direction with a housing means 20. Further, the selection of steering spindle can provide either for a minimum distance between a shaft 4 and a connecting portion of the spindle with either type of housing means. Four assembly variations of a power steering device can thus be achieved by selectivity of a pair of steering worm spindles and a pair or housing means. It will also be apparent that with a pair of spindles, two variations are possible, or with a pair of housings, two variations are possible.

What is claimed is:

1. A combination of members for selective assembly of a power steering device; comprising in said combination housing means effecting a pressure cylinder portion having opposed apertured ends, and also effecting a steering shaft housing portion; said latter housing portion being nearer to one said apertured end of said housing means; a steering shaft and gear sector for insertion in said latter housing portion with said steering shaft extending out of one side thereof; a pressure piston for insertion in said cylinder portion for engagement with said gear sector; selective steering worm spindles for insertion through said pressure piston and insertable into said cylinder portion through either of said apertured ends; each said steering worm spindle having a steering connecting portion to extend from said housing means; and each having a worm section to coact with said pressure piston; interchangeable closure means for the apertured ends of said cylinder portion; said apertured ends being dimensioned so that either can accommodate said interchangeable closure means dependent upon selection of the apertured end into which said steering worm spindle is inserted; said steering worm spindles differing essentially in the axial distance between the respective steering connecting portions and the respective worm thread sections; whereby a power steering device may be assembled with either steering worm spindle dependent on the distance selection between a steering connecting portion and the axis of a steering shaft in said steering shaft housing portion or between said latter axis and said nearer end of said housing means.

2. A combination as set forth in claim 1, said housing means comprising a pair of housings for selective assembly in said combination; each said housing having an aperture in the respective steering shaft housing portion for a steering shaft to extend therefrom; said apertures being located so as to be on opposite sides of the respective steering shaft housing portions.

3. A combination as set forth in claim 1, said interchangeable closure means comprising sealing means for sealing said steering worm spindle at each said apertured end.

4. A combination as set forth in claim 1, said sealing means comprising a closure plug and a ring seal of the same diameter.

5. A selective assembly arrangement for a power steering device to effect predetermined external configurations, comprising a housing having a cylinder portion and a steering shaft portion offset from said cylinder portion; said cylinder portion having opposed apertured ends and interchangeable sealing means accommodatable in either apertured end for sealing a steering worm spindle; one said housing end being removable for insertion of a piston and being further from said steering shaft portion than said other end; a pair of steering worm spindles each having a connecting portion to extend from said cylinder portion, and being selectively and reversibly insertable therein so that said connecting portion can be disposed at a predetermined distance from said steering shaft housing; said steering worm spindles each having a worm section and differing in the distance from the respective connecting portion to the respective worm section so that said worm section of either steering worm spindle is medially disposed to coact with a worm nut of a pressure piston in said cylinder at neutral steering position of said piston in said cylinder.

* * * * *